United States Patent [19]

Nakanishi et al.

[11] Patent Number: 4,511,687

[45] Date of Patent: Apr. 16, 1985

[54] POLYCAPROLACTONE COMPOSITION

[75] Inventors: Michio Nakanishi, Niiza; Naoki Nakashima, Ohtake, both of Japan

[73] Assignee: Daicel Chemical Industries, Ltd., Sakai, Japan

[21] Appl. No.: 383,054

[22] Filed: May 28, 1982

[30] Foreign Application Priority Data

Jun. 3, 1981 [JP] Japan ................................ 56-85343
Jun. 4, 1981 [JP] Japan ................................ 56-86039

[51] Int. Cl.³ ............................................. C08L 93/04
[52] U.S. Cl. .................................... 524/270; 524/271; 524/273; 524/272; 525/186; 525/190
[58] Field of Search ............... 524/270, 271, 273, 274, 524/272, 474, 484; 525/186, 190, 356; 528/354, 357, 356, 384, 386

[56] References Cited

U.S. PATENT DOCUMENTS

| | | | |
|---|---|---|---|
| 3,865,769 | 2/1975 | Davidson | 524/270 |
| 4,144,223 | 3/1979 | Kent | 525/186 |
| 4,207,231 | 6/1980 | Goodrich | 524/270 |
| 4,225,476 | 9/1980 | Hammer et al. | 524/270 |
| 4,244,866 | 1/1981 | Schefbauer | 524/270 |
| 4,289,873 | 9/1981 | Kubo et al. | 528/357 |
| 4,302,576 | 11/1981 | Nash | 525/186 |

*Primary Examiner*—Josephine L. Barr
*Attorney, Agent, or Firm*—Flynn, Thiel, Boutell & Tanis

[57] ABSTRACT

A synthetic resin composition comprises (A) 100 parts by weight of polycaprolactone and (B-1) 10 to 70 parts by weight of a thermoplastic resin and 1 to 30 parts by weight of a tackifier, or (B-2) 10 to 70 parts by weight of a chlorinated polyolefin.

5 Claims, No Drawings

POLYCAPROLACTONE COMPOSITION

BACKGROUND OF THE INVENTION

Field of the Invention

The invention relates to a polycaprolactone composition which has been blended with another resin, that is, (B-1) a thermoplastic resin and a tackifier or (B-2) a chlorinated polyolefin.

Having a melting point as low as 60° C. and being easy in processing, polycaprolactone is widely used. However, due to lack of sufficient flexural resistance and tackiness, it is not applied to moldings such as a core material for shoes.

It is an object of this invention to provide a polycaprolactone resin composition which is free of the above-mentioned drawbacks and is superior in flexural resistance and tackiness.

The invention relates to a synthetic resin composition which comprises (A) 100 parts by weight of polycaprolactone and (B-1) 10 to 70 parts by weight of a thermoplastic resin and 1 to 30 parts by weight of a tackifier, or (B-2) 10 to 70 parts by weight of a chlorinated polyolefin.

The polycaprolactone used in this invention may be produced according to the process as disclosed in Japanese Patent Application No. 126221/1979.

The polymer used in this invention preferably has a number-average molecular weight from 5,000 to 200,000 especially from 10,000 to 200,000.

The thermoplastic resin other than polycaprolactone is used in this invention in an amount from 10 to 70 parts by weight for 100 parts by weight of polycaprolactone. The thermoplastic resin includes polyolefins such as polyethylene, polypropylene, vinyl chloride resin, and ethylene-vinyl acetate copolymer; and styrene resins such as polystyrene. Preferable among them are chlorinated polyolefins such as chlorinated polyethylene. Examples of chlorinated polyolefins include chlorinated polyethylene, chlorinated polypropylene, and chlorinated polybutene. The chlorinated polyethylene is obtained by chlorinating polyethylene, ethylene-propylene copolymer or ethylene-butene copolymer and contains 25 to 45 wt% of chlorine. The chlorinated polypropylene is obtained by chlorinating isotactic polypropylene or atactic polypropylene and contains 15 to 35 wt% of chlorine.

The resin composition of this invention is a polycaprolactone resin composition which has the low-temperature processability of polycaprolactone and has superior flexural resistance and tackiness.

According to this invention, the use of a tackifier is indispensable. Examples of such tackifier include rosin, maleic rosin, ester gum, ester gum H, polyterpene resin, $C_5$ petroleum resin, $C_9$ petroleum resin, dicyclopentadiene petroleum resin, styrene resin, alkylphenolic resin, and terpene phenolic resin. This tackifier resin is used in an amount from 1 to 30 parts by weight based on 100 parts by weight of polycaprolactone.

The composition of this invention may be incorporated as required with slip agent, stabilizer, pigment, etc. which are commonly added to thermoplastic resin compositions. It is preferable to add an epoxy stabilizer or lead stabilizer which is commonly used for chlorinated polyolefins.

The resin composition of this invention is useful as a molding material. It may be used, for example, as a shoe core material in the form of a sheet and as a hot melt adhesive.

The foregoing concerns the composition where components (A) and (B-1) have been blended. When a chlorinated polyolefin (B-2) is used as the thermoplastic resin, the tackifier may not be contained in the composition according to the invention. As the chlorinated polyolefin, there are preferably used the above mentioned embodiments. The combination between (A) and (B-2) is improved in point of flexural resistance and further possesses processability of polycaprolactone per se which can be attained even at a low temperature. The amount of the component (B-2) is 10 to 70 parts by weight, based on 100 parts by weight of (A).

EXAMPLES 1 TO 8 AND COMPARATIVE EXAMPLE 1

The resin compositions were prepared from 100 parts by weight of polycaprolactone having a number-average molecular weight of 70,000, and chlorinated polyolefin and tackifier in varied amounts. The mixtures of these components were kneaded at 50° to 60° C. for more than 5 minutes and the resulting melts were pressed at 15 to 20 kg/cm$^2$ for 3 minutes into 1.4 mm thick sheets. The sheet specimens were evaluated with respect to flexural resistance and tackiness. The results are shown in Table 1, together with those of comparative examples to illustrate the usefulness of this invention.

(1) Flexural resistance

A sheet specimen was folded and folded back three times. Results are indicated by symbols as follows:
○ . . . No crease occurred.
△ . . . A crease occurred slightly.
X . . . A crease occurred severely.

(2) Tackiness

A sheet specimen and a piece of paper placed one over another were pressed at 80° C. under a pressure of 10 kg/cm$^2$ for 30 seconds, and tackiness was measured at room temperature after cooling.

Results are indicated by symbols as follows:
◎ . . . Very high tackiness
○ . . . High tackiness
X . . . Weak tackiness In these examples, the following polycaprolactone, chlorinated polyolefin, and tackifier were used.

Polycaprolactone:
"PLACCEL H-7", a product of Daicel Chemical Industries, Ltd.

Chlorinated polyethylene:
"Daisolac MR-104" (chlorine content 40%), and
"Daisolac G-235" (chlorine content 35%).
Both are products of Osaka Soda Co., Ltd.

Tackifier:
"Teskid MR2-G" rosin-modified maleic acid resin, a product of Tokushima Seiyu Co., Ltd.

The number-average molecular weight of polycaprolactone was determined by GPC as specified below.

Apparatus: LC-3A made by Shimadzu Seisakusho Ltd.
Solvent: Tetrahydrofuran 1 ml/min
Temperature: Room temperature
Columns: HSG-PRE (one), HSG-20 (one), HSG-15 (three), and HSG-10 (one), made by Shimadzu
Detector: Shodex RI SE-11 made by Showa Denko K.K.

TABLE 1

| | Polycaprolactone PLACCEL H-7 (parts) | Chlorinated polyethylene | | Rosin-modified maleic acid resin Teskid MR2-G (parts) | Flexural Strength | Tackiness |
|---|---|---|---|---|---|---|
| | | Daisolac MR-104 (parts) | Daisolac G-235 (parts) | | | |
| | Flexural Resistance and Tackiness | | | | | |
| Example 1-1 | 100 | 50 | 0 | 5 | Δ | ○ |
| Example 1-2 | 100 | 50 | 0 | 10 | Δ | ◎ |
| Example 2-1 | 100 | 40 | 10 | 5 | Δ | ○ |
| Example 2-2 | 100 | 40 | 10 | 10 | Δ | ◎ |
| Example 3-1 | 100 | 70 | 0 | 5 | ○ | ○ |
| Example 3-2 | 100 | 70 | 0 | 10 | ○ | ◎ |
| Example 4-1 | 100 | 50 | 20 | 5 | ○ | ○ |
| Example 4-2 | 100 | 50 | 20 | 10 | ○ | ◎ |
| Comparative Example 1 | 100 | 0 | 0 | 0 | X | ◎ |
| Example 5 | 100 | 50 | 0 | 0 | Δ | X |
| Example 6 | 100 | 40 | 10 | 0 | Δ | X |
| Example 7 | 100 | 70 | 0 | 0 | | X |
| Example 8 | 100 | 50 | 20 | 0 | | X |

The embodiments of the invention in which an exclusive property or privilege is claimed are defined as follows:

1. A synthetic resin composition which comprises a blend of (A) 100 parts by weight of polycaprolactone having a number-average molecular weight of from 5,000 to 200,000, with either (B-1) from 10 to 70 parts by weight of a moldable thermoplastic resin selected from the group consisting of polyethylene, polypropylene, vinyl chloride resin, ethylenevinyl acetate copolymer, moldable thermoplastic styrene resin, chlorinated polyethylene having a chlorine content of 25 to 45 wt.%, chlorinated polypropylene having a chlorine content of 15 to 35 wt.% and chlorinated polybutene, and 1 to 30 parts by weight of a tackifier selected from the group consisting of rosin, maleic rosin, ester gum, ester gum H, polyterpene resin, $C_5$ petroleum resin, $C_9$ petroleum resin, dicyclopentadiene petroleum resin, tackifying styrene resin different from said moldable thermoplastic styrene resin, alkylphenolic resin and terpene phenolic resin, or (B-2) 10 to 70 parts by weight of a chlorinated polyolefin selected from the group consisting of chlorinated polyethylene having a chlorine content of 25 to 45 wt.%, chlorinated polypropylene having a chlorine content of 15 to 35 wt.% and chlorinated polybutene.

2. A composition as claimed in claim 1 in which said chlorinated polyolefin is said chlorinated polyethylene containing 25 to 45 percent by weight of chlorine, and said chlorinated polyethylene is obtained by chlorinating polyethylene, ethylene-propylene copolymer or ethylene-butene copolymer.

3. A composition as claimed in claim 1, in which said chlorinated polyolefin is said chlorinated polypropylene containing 15 to 35 percent by weight of chlorine, and said chlorinated polypropylene is obtained by chlorinating isotactic polypropylene or atactic polypropylene.

4. A synthetic resin composition, the synthetic resin components of which consist essentially of a blend of 100 parts by weight of polycaprolactone having a number-average molecular weight of from 5,000 to 200,000, 10 to 70 parts by weight of chlorinated polyethylene having a chlorine content of from 25 to 45 wt.% and 1 to 30 parts by weight of maleic rosin.

5. A synthetic resin composition, the synthetic resin components of which consist essentially of a blend of 100 parts by weight of polycaprolactone having a number-average molecular weight of from 5,000 to 200,000 and 10 to 70 parts by weight of chlorinated polyethylene having a chlorine content of from 25 to 45 wt.%.

* * * * *